(12) United States Patent
Waldner

(10) Patent No.: US 7,085,951 B2
(45) Date of Patent: Aug. 1, 2006

(54) METHOD FOR GENERATING A SIGNAL PULSE SEQUENCE WITH A PREDETERMINED STABLE FUNDAMENTAL FREQUENCY

(75) Inventor: Markus Waldner, Klagenfurt (AT)

(73) Assignee: Infineon Technologies AG, München (DE)

( * ) Notice: Subject to any disclaimer, the term of this patent is extended or adjusted under 35 U.S.C. 154(b) by 445 days.

(21) Appl. No.: 10/350,192

(22) Filed: Jan. 24, 2003

(65) Prior Publication Data

US 2003/0154042 A1    Aug. 14, 2003

(30) Foreign Application Priority Data

Jan. 31, 2002    (DE) ................................ 102 03 892

(51) Int. Cl.
*G06F 1/04*    (2006.01)
(52) U.S. Cl. ...................... 713/503; 713/600; 375/376
(58) Field of Classification Search ................ 713/503, 713/600; 375/376
See application file for complete search history.

(56) References Cited

U.S. PATENT DOCUMENTS

| 4,472,785 | A | * | 9/1984 | Kasuga ..................... 708/270 |
| 5,136,267 | A | * | 8/1992 | Cabot ........................ 333/174 |
| 5,388,127 | A | | 2/1995 | Scarpa |
| 5,425,060 | A | | 6/1995 | Roberts et al. |
| 5,584,062 | A | * | 12/1996 | Meador et al. ............ 455/260 |
| 5,945,889 | A | * | 8/1999 | Shanthi-Pavan et al. ... 333/17.1 |
| 6,236,691 | B1 | * | 5/2001 | Johnson ..................... 375/340 |
| 6,380,692 | B1 | * | 4/2002 | Newman et al. ............ 315/194 |
| 6,680,644 | B1 | * | 1/2004 | Cole ......................... 327/551 |

FOREIGN PATENT DOCUMENTS

| DE | 69421834 | 7/2000 |
| EP | 0610638 | 8/1994 |

OTHER PUBLICATIONS

Kim et al. Symbol Timing Recovery Using Digital Spectral Line Method for 16-CAP VDSL System, by 1998 Global Telecommunications Conference (GLOBECOM 1998) IEEE vol. 6 pp. 3467-3472.

Moon et al., "Timing recovery in CMOS using nonlinear spectral-line method," IEEE 1996 Custom Integrated Circuits Conference, pp. 13-16 (1996).

Cariolaro et al., "A General Spectral Analysis of Time Jitter produced in a Regenerative Repeater," IEEE Transactions of Communications, pp. 417-426 (1977).

* cited by examiner

*Primary Examiner*—Thomas Lee
*Assistant Examiner*—Vincent Tran
(74) *Attorney, Agent, or Firm*—Greenblum & Bernstein, P.L.C.

(57) ABSTRACT

A method for generating a signal pulse sequence with a predetermined stable fundamental frequency from a sequence of signal pulses whose frequency fluctuates and has the spectral components whose frequency is at least a predetermined multiple of the fundamental frequency. The method includes, feeding the sequence of signal pulses to a digital filter, arranging a passband of the digital filter around the fundamental frequency, blocking, using the digital filter, around a predetermined half the sampling frequency. The method further includes outputting a signed output signal when the digital filter is excited, and generating a clock signal pulse for each change in sign of the output signal.

17 Claims, 3 Drawing Sheets

METHOD FOR GENERATING A SIGNAL PULSE SEQUENCE WITH A PREDETERMINED STABLE FUNDAMENTAL FREQUENCY

CROSS-REFERENCE TO RELATED APPLICATION

The present application claims priority under 35 U.S.C. Å119 of German Patent Application No. 102 03 892.9, filed on Jan. 31, 2002, the disclosure of which is expressly incorporated by reference herein in its entirety.

FIELD OF THE INVENTION

The invention relates to a method for generating a signal pulse sequence with a predetermined stable fundamental frequency, i.e. the recovery of a clock signal.

DESCRIPTION OF THE RELATED ART

In digital circuits, a clock signal (clock) is generally always used in order that the individual computation or work steps can be processed synchronously. If the period duration of the clock is not always identical and fluctuates to a very great extent (exhibits jitter), then that can lead to malfunctions in the circuit.

In the prior art, reliance is generally placed on the clock signal fluctuating so little (having such little "jitter") that the application is not disturbed thereby. If appropriate, the digital circuit is designed such that it is robust with respect to frequency fluctuations in the clock signal.

However, if other clock signals with higher frequencies are also required in addition to the externally applied clock, the external clock signal first passes into a PLL control loop which is designed so well that as little jitter as possible is transmitted. However, this results in an increased outlay on the circuitry, i.e. it is necessary to use expensive external modules which condition the clock signal and contain a complex PLL control.

SUMMARY OF THE INVENTION

It is a feature of the invention to specify a simple method by which a frequency-stable clock signal can be recovered from a noisy clock signal.

In the case of the method according to the invention with a "Jittered Clock recovery filter," the noisy clock signal is interpreted as an ideal square-wave signal having additionally modulated frequencies besides the fundamental and the corresponding harmonics, as a result of which the deviation from the ideal square wave then occurs. The fundamental can now be filtered out again by a bandpass filter coordinated with the clock signal frequency (frequency of the fundamental). If the passband is very narrow, hardly any harmonics and thus no jitter is transmitted.

The invention's method for generating a signal pulse sequence with a predetermined stable fundamental frequency from a sequence of signal pulses whose frequency fluctuates and has the spectral components whose frequency is at least a predetermined multiple of the fundamental frequency, is characterized in that the sequence of signal pulses is fed to a digital filter, whose passband lies around the fundamental frequency and which blocks around a predetermined half the sampling frequency and which outputs a signed output signal in the event of excitation, and a clock signal pulse is generated in the event of each change in sign of the output signal.

In particular, the digital filter comprises a bandpass filter, which blocks at the frequency zero and the half the sampling frequency, and a zero crossing detector, which generates a clock signal pulse in the event of each zero crossing.

In a preferred embodiment of the invention, the bandpass filter comprises an FIR filter and an IIR filter, which are connected in series, the natural frequency of the IIR filter being equal to the fundamental frequency.

For specific applications, the fundamental frequency is multiplied by a PLL control loop downstream of the digital filter. In this case, the multiplied fundamental frequency downstream of the PLL control loop is used as sampling frequency by the bandpass filter and the zero crossing detector.

One advantage of the invention is that a complex and precise PLL control is not required. The poorer and slower control which can contain the PLL control loop needs less chip area and is thus less expensive not just in terms of the development outlay; a saving is made, moreover, in respect of expensive external chips which condition the clock signal, thereby driving up the costs of boards, etc., since a circuit which is to be robust with respect to jitter has to be designed for higher clock frequencies than the actual operating clock. This means that stronger drivers and stronger "pipelining" must be provided, which is associated with more design outlay. In addition, more area is required on account of the stronger drivers, and that means higher costs. Since a digital filter is used in the case of the method according to the invention, hardly any chip area is required, external influences (temperature) are less significant, and the method is easy to implement on account of the simple structure of a digital filter.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
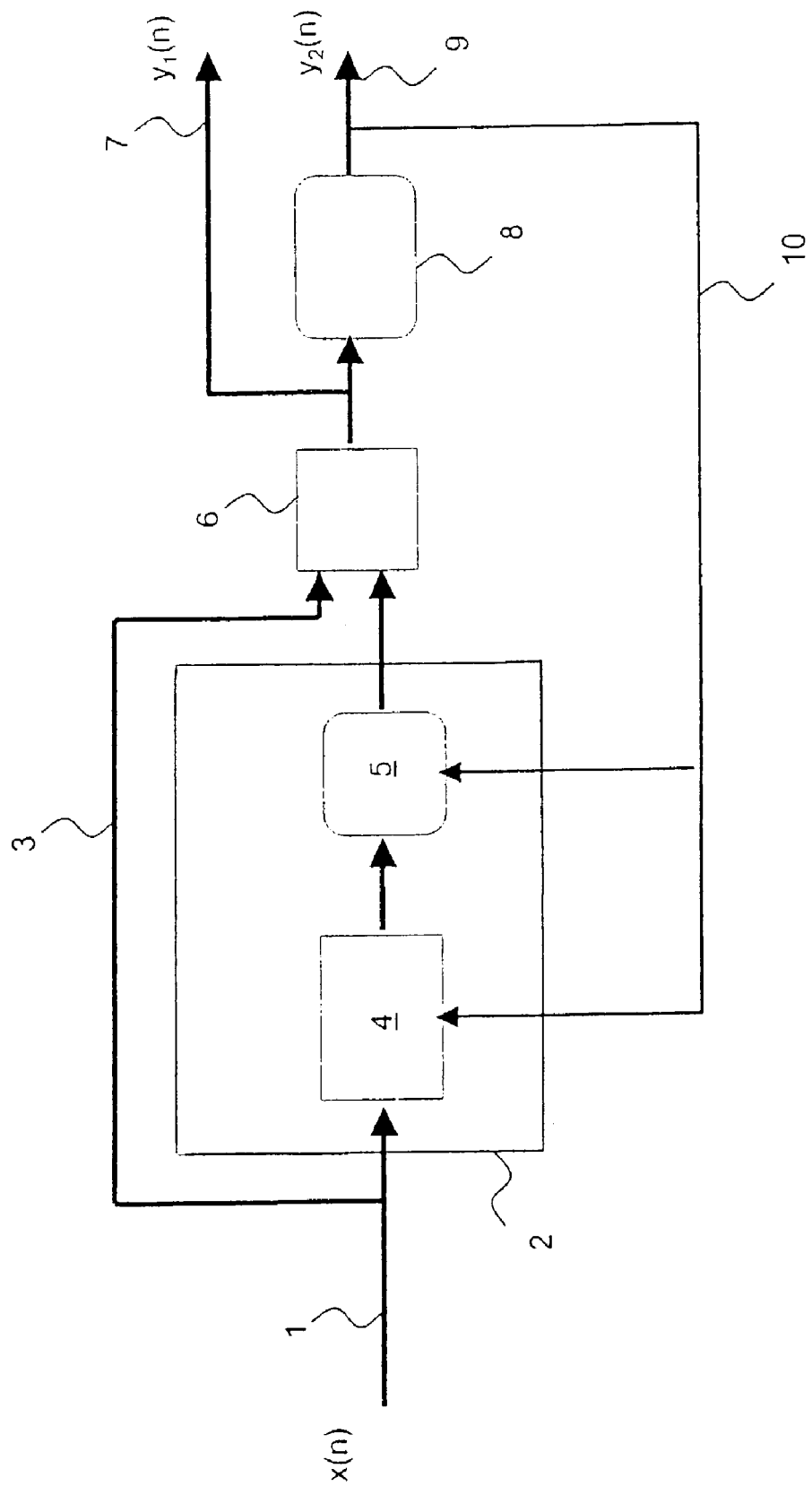
FIG. 1 shows a filter construction which can be used to carry out the method according to the invention.

Referring to the drawings wherein like characters represent like elements, FIG. 1 shows a filter construction for generating a signal pulse sequence with a predetermined stable fundamental frequency, which can be used to carry out the method according to the invention. Via an input 1, the filter construction is supplied with a sequence of signal pulses x(n) whose frequency fluctuates and which thus cannot be used directly for clocking time-critical operations in a circuit (not illustrated).

The frequency fluctuations of the input pulses can be interpreted such that the input pulses have, in addition to their desired fundamental frequency $f_0$, spectral components whose frequency lies above the fundamental frequency and, in particular, is at least a predetermined multiple of the fundamental frequency $f_0$. The spectral component of the input pulses with $f_0$ or a multiple thereof is used independently of its amplitude in order to excite a system to effect (resonant) oscillations. The oscillations of the system then serve as a reference for the generation of the desired frequency-stable clock signal. To that end, in a preferred embodiment of the invention, the zero crossing of the (resonant) oscillation amplitude is detected. However, in order to permit zero crossings to pass only at the resonant frequency, a corresponding blocking filter is provided which suppresses all undesired frequency components.

According to the invention, the sequence of signal pulses x(n) is fed to a digital filter 2, whose passband lies around the fundamental frequency $f_0$ and which blocks around a predetermined half the sampling frequency $f_a/2$. By contrast, in the passband, i.e. in the event of excitation, the filter is designed in such a way that it outputs a signed output signal. Such a filter is the bandpass filter 4, which is part of the digital filter 2. Thus, if the incoming signal component has a frequency which differs from the desired fundamental frequency $f_0$, then the bandpass filter 4 and thus the digital filter 2 block, so that no clock signal is present at the downstream circuit. By contrast, if the incoming signal has a component whose frequency corresponds to $f_0$, then the bandpass filter 4 is excited by said frequency component to effect oscillation, the oscillation frequency being the desired natural frequency.

The output signal of the bandpass filter 4 is coupled into a zero detector 5, which generates a clock signal pulse in the event of each change in sign of the output signal of the bandpass filter 4. The method of operation and the technical implementation of such a zero detector 5 are known to the person skilled in the art and are not, therefore, explained in further detail here. Moreover, it is also possible to use other elements which generate a clock pulse when the output signal from the bandpass filter 4 passes through a specific value (maximum or minimum).

The clock pulses y(n) generated by the zero detector 5 have the frequency $f_0$, which is the resonant frequency of the bandpass filter 4 and is equal to the desired frequency.

The frequency-stable clock pulses y(n) can now be processed further or used directly. In the second case, they are fed via an output 7 into the downstream circuit (not illustrated), otherwise they are converted to a higher frequency by a PLL control loop 8 and only then fed via an output 9 into the downstream circuit (not illustrated).

The multiplied frequency downstream of the PLL control loop 8 can simultaneously be used as a control clock for the above-described components of the digital filter 2 in order to control the oversampling of the input signal of said components. Therefore, in the embodiment shown according to FIG. 1, it is looped back via a feedback line 10 and is present at the bandpass filter 4 and the zero detector 5 in the digital filter 2.

Since for supplying the digital filter 2 with the sampling frequency $f_a$, the PLL control loop 8 must first build up oscillations, a multiplexer 6 and a bypass line 3 are provided in the embodiment shown, whereby at the beginning of the clock signal recovery, i.e. directly after the switch-on of the filter construction, the PLL control loop 8 is first driven up with the frequency-unstable clock, and, after the end of the transient process, the input of the PLL control loop 8 is changed over to the frequency-stable clock signal by the multiplexer 6.

Figure 2:
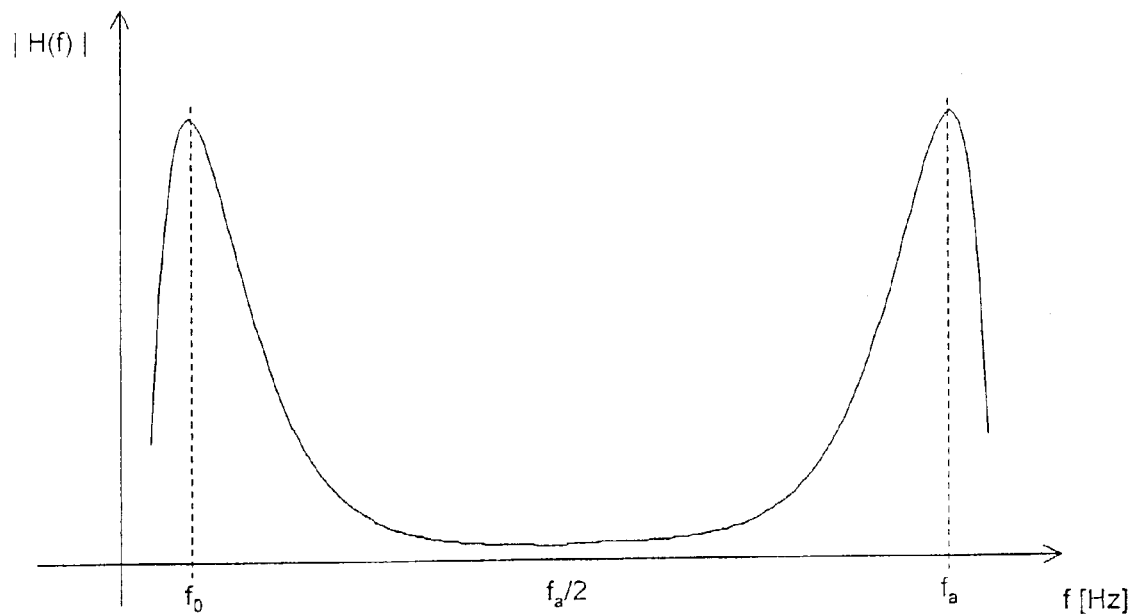
FIG. 2 shows the transmission curve of the filter according to FIG. 1.

FIG. 2 illustrates the profile of the transmission curve |H(f)| with respect to the frequency. As can be seen, this curve has its maximum as $f_0$ and $f_a$. In other words, the attenuation of the transmitted signal is minimal at $f_0$ and $f_a$. The transmission curve decreases sharply between these two maxima, down to zero at half the sampling frequency, i.e. at $f_a/2$.

The profile of the curve makes it clear that essentially only oscillations with the frequency $f_0$, are excited.

Figure 3:
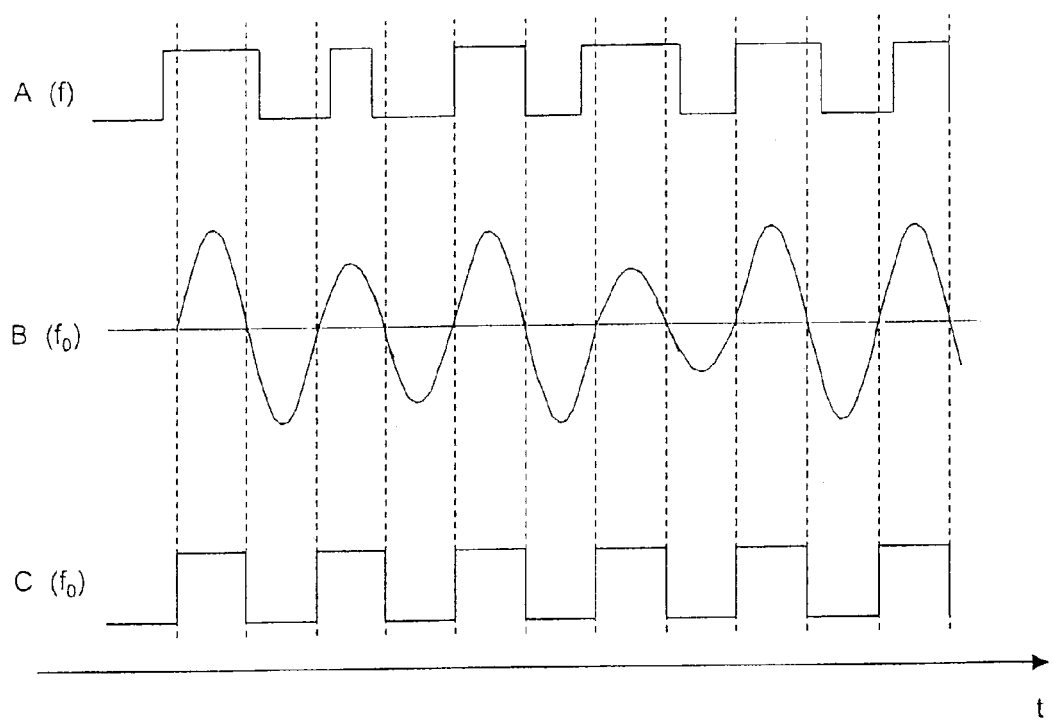
FIG. 3 shows a timing diagram for elucidating the generation of the frequency-stable signal pulses from an input pulse sequence which is not frequency-stable.

FIG. 3 shows the sequence of input pulses A. The latter have approximately the desired frequency $f_0$, but are subjected to frequency fluctuations indicated by the deviations of their edges from the "exact" vertical lines.

The deviation of the actual frequency of the input pulses A from the desired frequency has the effect that the spectral component [sic] in the input pulses A with the desired frequency $f_0$, have a different amplitude. Independently of that, however, the bandpass filter 4 oscillates at its resonant frequency $f_0$, excited precisely by the spectral components $f_0$ in the input pulses. The oscillation amplitude of the bandpass filter is designated by B in FIG. 3. It fluctuates depending on the "correspondence" of the frequency of the input pulses A to the resonant frequency of the bandpass filter 4.

In the event of each zero crossing of the signal B, which coincides with the "exact" vertical lines, the zero crossing detector 5 outputs a square-wave pulse, so that the sequence of square-wave pulses has the exact frequency $f_0$. This sequence of exact clock signal pulses is designated by C.

Figure 4:
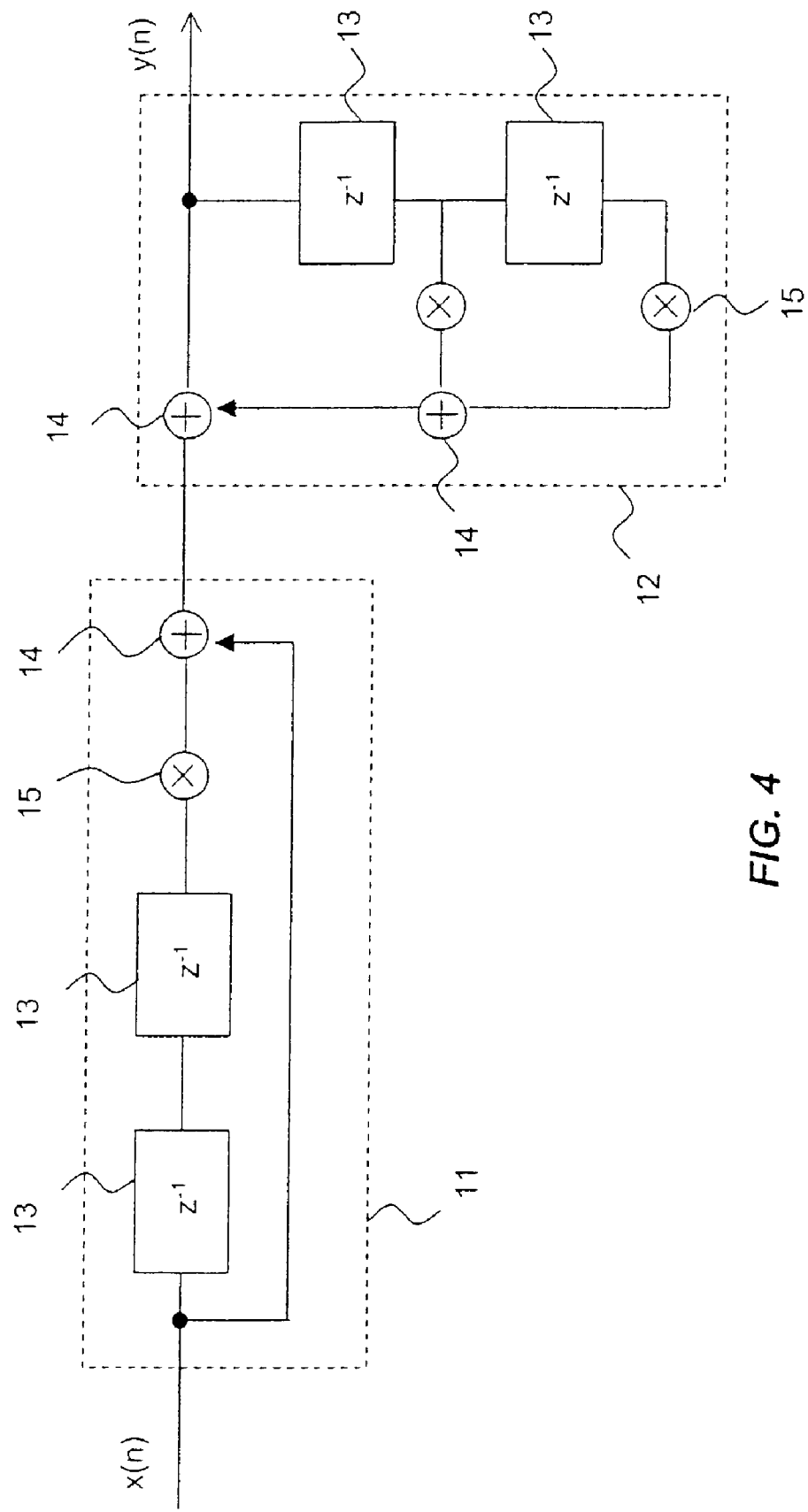
FIG. 4 shows an embodiment of the bandpass filter from FIG. 1.

FIG. 4 shows one possible embodiment of the bandpass filter 4. The bandpass filter 4 is composed of an FIR filter 11 and an IIR filter 12, which are connected in series. The natural frequency of the IIR filter 12 is equal to the desired fundamental frequency $f_0$. The construction of the FIR filter 11 and IIR filter 12 from delay elements 13, adder 14 and multipliers 15 is known to the person skilled in the art and is not explained in further detail here. It should be taken into account, however, that the multipliers 15 multiply by a dedicated value in each case, which is not specified in the figure but which generally differs from that of other multipliers 15 and may, if appropriate, also be negative.

It is a feature of the invention that a digital IIR filter 12 is used for generating an oscillation with the desired frequency $f_0$. This is because the IIR filter 12 is reinitialized in the event of each changeover of the clock signal C. This reinitialization always takes place, irrespective of whether or not there is a change in the amplitude of the signal B. In the event of each of said reinitializations, the state of the IIR filter 12 is changed, so that the IIR filter is always in a settled state for the signal component with the frequency $f_0$.

A further feature of the invention is that the operating clock which the filter itself needs in order to be able to operate is provided by the PLL control loop 8, which, for its part, receives its frequency-stable clock signal from the filter. The filter 2 is connected in only when the PLL control loop 8 has settled. Before this, the clock signal is routed past the filter 2.

The principle of the invention functions better, the higher the oversampling.

The delay elements are preferably registers having a width of 8 bits.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for generating a signal pulse sequence with a predetermined stable fundamental frequency from a sequence of signal pulses whose frequency fluctuates, comprising:
   feeding the sequence of signal pulses to a digital filter comprising a bandpass filter having a passband set around the fundamental frequency;
   blocking a predetermined half sampling frequency and a frequency zero, using the digital filter;
   outputting a signed output signal when the digital filter is excited; and
   generating a clock signal pulse for each change in sign of the output signal by using a zero crossing detector to detect zero crossings.

2. The method according to claim 1, wherein the bandpass filter comprises an FIR filter and an IIR filter connected in series, a natural frequency of the IIR filter being equal to the fundamental frequency.

3. The method according to claim 2, further comprising multiplying the fundamental frequency by a PLL control loop, downstream of the digital filter.

4. The method according to claim 3, further comprising using, by the bandpass filter and the zero crossing detector, the multiplied fundamental frequency as a sampling frequency.

5. The method according to claim 1, further comprising multiplying the fundamental frequency by a PLL control loop, downstream of the digital filter.

6. The method according to claim 5, further comprising using, by the digital filter and a zero crossing detector, the multiplied fundamental frequency as a sampling frequency.

7. The method according to claim 1, further comprising converting the predetermined stable fundamental frequency to a sampling frequency for outputting the signed output signal and generating the clock signal pulses, wherein the generated clock signal pulses have the predetermined stable fundamental frequency.

8. A method for generating a signal pulse sequence with a predetermined stable fundamental frequency from a sequence of signal pulses whose frequency fluctuates comprising:
   feeding the sequence of signal pulses to a digital filter having a passband set around the fundamental frequency;
   blocking a predetermined half sampling frequency using the digital filter;
   outputting a signed output signal when the digital filter is excited;
   generating a clock signal pulse for each change in sign of the output signal;
   initially supplying the sequence of signal pulses whose frequency fluctuates to a PLL control loop; and
   after a transient period, supplying the clock signal pulses to the PLL control loop instead of the sequence of signal pulses whose frequency fluctuates.

9. The method according to claim 8, further comprising multiplying the fundamental frequency by a PLL control loop, downstream of the digital filter.

10. The method according to claim 9, further comprising using, by the bandpass filter and the zero crossing detector, the multiplied fundamental frequency as a sampling frequency.

11. The method according to claim 8, further comprising converting the predetermined stable fundamental frequency to a sampling frequency for outputting the signed output signal and generating the clock signal pulses, wherein the generated clock signal pulses have the predetermined stable fundamental frequency.

12. A circuit that generates a signal pulse sequence with a predetermined stable fundamental frequency from a sequence of signal pulses whose frequency fluctuates, comprising:
   a digital filter, comprising a bandpass filter having a passband set around the fundamental frequency, that receives the sequence of signal pulses whose frequency fluctuates, blocks an approximate predetermined half of a sampling frequency and a frequency zero, and outputs a signed output signal when the digital filter is excited; and
   a zero crossing detector that generates clock signal pulses for each change in sign of the output signal by detecting zero crossing, the clock signal pulses having the predetermined stable fundamental frequency.

13. The circuit according to claim 12, wherein the bandpass filter comprises an FIR filter and an IIR filter connected in series, a natural frequency of the IIR filter being equal to the fundamental frequency.

14. A circuit that generates a signal pulse sequence with a predetermined stable fundamental frequency from a sequence of signal pulses whose frequency fluctuates comprising:
   a digital filter, having a passband set around the fundamental frequency, that receives the sequence of signal pulses whose frequency fluctuates, blocks an approximate predetermined half of a sampling frequency, and outputs a signed output signal when the digital filter is excited;

a zero crossing detector that generates clock signal pulses for each change in sign of the output signal, the clock signal pulses having the predetermined stable fundamental frequency; and a PLL control loop that converts the predetermined stable fundamental frequency to a sampling frequency, and provides the sampling frequency to the digital filter and zero crossing detector.

15. The circuit according to claim 14, wherein the PLL control loop is provided downstream of the digital filter.

16. A circuit that generates a signal pulse sequence with a predetermined stable fundamental frequency from a sequence of signal pulses whose frequency fluctuates, comprising:

a digital filter, having a passband set around the fundamental frequency, that receives the sequence of signal pulses whose frequency fluctuates, blocks an approximate predetermined half of a sampling frequency, and outputs a signed output signal when the digital filter is excited;

a zero crossing detector that generates clock signal pulses for each change in sign of the output signal, the clock signal pulses having the predetermined stable fundamental frequency, wherein the sequence of signal pulses whose frequency fluctuates are initially supplied to the a PLL control loop, and, after a transient period, the generated clock signal pulses are supplied to the PLL control loop instead of the sequence of signal pulses whose frequency fluctuates.

17. The circuit according to claim 16, wherein the PLL control loop is provided downstream of the digital filter.

* * * * *

UNITED STATES PATENT AND TRADEMARK OFFICE
CERTIFICATE OF CORRECTION

PATENT NO. : 7,085,951 B2 Page 1 of 1
APPLICATION NO. : 10/350192
DATED : August 1, 2006
INVENTOR(S) : Waldner It is certified that error appears in the above-identified patent and that said Letters Patent is hereby corrected as shown below:

At column 6, line 26 (claim 9, line 2) of the printed patent, "by a PLL" should be --by the PLL--

At column 6, line 52 (claim 12, line 14) of the printed patent, "crossing" should be --crossings--

Signed and Sealed this

Twenty-fifth Day of December, 2007

JON W. DUDAS
*Director of the United States Patent and Trademark Office*